June 6, 1961
F. P. GRAY
2,987,166
BAG ELEVATOR
Filed Dec. 19, 1958
3 Sheets-Sheet 1
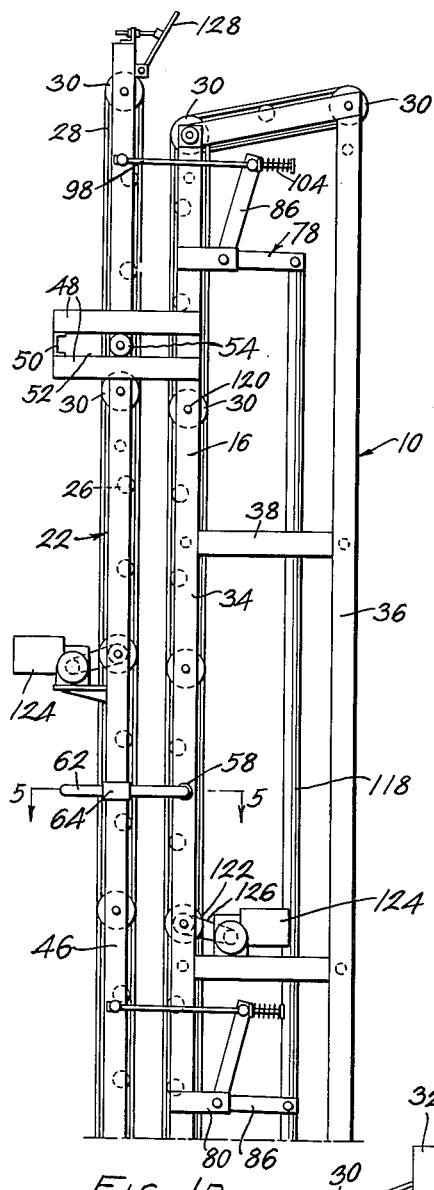
FIG. 1B.
FIG. 1A.
INVENTOR.
FRANKLIN P. GRAY
BY
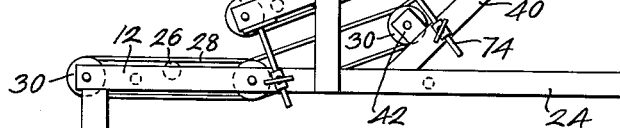
ATTORNEYS June 6, 1961

F. P. GRAY 2,987,166

BAG ELEVATOR

Filed Dec. 19, 1958

INVENTOR.
FRANKLIN P. GRAY
BY
ATTORNEYS

June 6, 1961

F. P. GRAY 2,987,166

BAG ELEVATOR

Filed Dec. 19, 1958

INVENTOR.
FRANKLIN P. GRAY
BY

ATTORNEYS

United States Patent Office 2,987,166
Patented June 6, 1961

---

2,987,166
BAG ELEVATOR
Franklin P. Gray, 2600 E. Flora Place, Denver, Colo.
Filed Dec. 19, 1958, Ser. No. 781,735
16 Claims. (Cl. 198—165)

This invention relates to spring belt conveyors and, more specifically, to a spring belt driven bag elevator.

One of the most efficient and versatile types of conveyors is that which comprises a plurality of grooved rollers arranged transversely in longitudinally spaced relation within a suitable frame and drivingly connected to one another by means of several endless spring belts. These units can handle a wide variety of both packaged and unpackaged materials rapidly and economically. Also, their construction makes it possible to design units which can be curved, arched, twisted and generally adapted to perform various troublesome conveying functions that are impossible, or at least extremely difficult, to achieve with other types of conveyors.

Perhaps the most significant advantage of the spring belt driven conveyor, however, is its ability to handle bulk granular or powdered materials packaged in paper or cloth bags without damaging the container and spilling the contents. Of course, wide fabric belt conveyors can accomplish this same function, but, their use is generally limited to straight runs with little or no slope above or below horizontal. The spring belt conveyor, on the other hand, is not limited in its application to straight and relatively level conveying operations.

In addition, spring belt driven units can be designed which will elevate filled bags vertically as they are received from a horizontal conveyor section while performing the incidental, but important, added function of flattening the packages. Few, if any, of the other well known types of conveyors can flatten and elevate the bags at the same time although flat, uniform packages are quite essential to economical storage and proper loading for transportation.

Unfortunately, however, certain difficulties have arisen in connection with the design of spring belt driven bag elevators for use in handling filled bags. The basic problem lies in the considerable non-uniformity of the packages that must be raised in the elevator without damage to the bag. Granular or powdered materials obviously tend to fall and concentrate in the bottom of the bag as it is turned up on end thus producing a somewhat tear-drop-shaped package that is quite likely to tear as it moves between the opposed conveyor belts. Also, many factors that are extremely difficult to control influence the shape of the individual packages which may vary considerably from one to another.

It has now been found, however, in accordance with the teachings of the instant invention that the aforementioned difficulties can be overcome through the novel expedient of providing the bag elevator with a yieldable frame section spring-biased toward a fixed frame section. Hydraulically-actuated means are also included for changing the spacing between the fixed and yieldable frame sections and also for varying the degree of spring-bias of the yieldable frame section against the bags in order to hold them securely without slipping yet preventing the bags from becoming torn. These desirable ends are realized by reason of a novel and yet simple hydraulically-actuated link assembly interconnecting the fixed and yieldable frame sections in a manner to compensate for non-uniform packages and different bag thicknesses. The bag-flattening assembly is also provided with manually-operable adjustment means for use in varying the spacing between a floating and rigid frame section to accommodate different bag sizes and oversize non-uniform packages delivered thereto from a level conveyor.

It is, therefore, the principal object of the present invention to provide a novel and improved spring belt driven bag elevator.

A second object is the provision of a bag-elevating device which also flattens the filled bags preparatory to elevating them thus providing for most efficient transportation and storage thereof.

A third object of the invention is to provide a bag-handling apparatus that includes a novel yieldable frame assembly which automatically conforms with variations in package shape and thickness thereby substantially eliminating any bag-tearing problems.

Another object is to provide a gravity-operated bag flattener which includes an adjustable floating conveyor frame operatively associated with the yieldable frame of a bag elevator.

Still another object is to provide a device of the class described which is readily adjustable to receive, flatten and elevate filled bags of many different thicknesses.

Further objects are to provide a bag elevator which is relatively simple, compact, rugged, versatile, easy to service, inexpensive, and one that is adaptable for use in a wide variety of different conveyor applications.

Other objects will be in part apparent and in part pointed out specifically hereinafter in connection with the description of the drawings that follow, and in which:

FIGURES 1A and 1B are a composite side elevation of the spring belt driven bag elevator that comprises the present invention, FIGURE 1B being the upper end of the unit shown in 1A;

Figure 2:
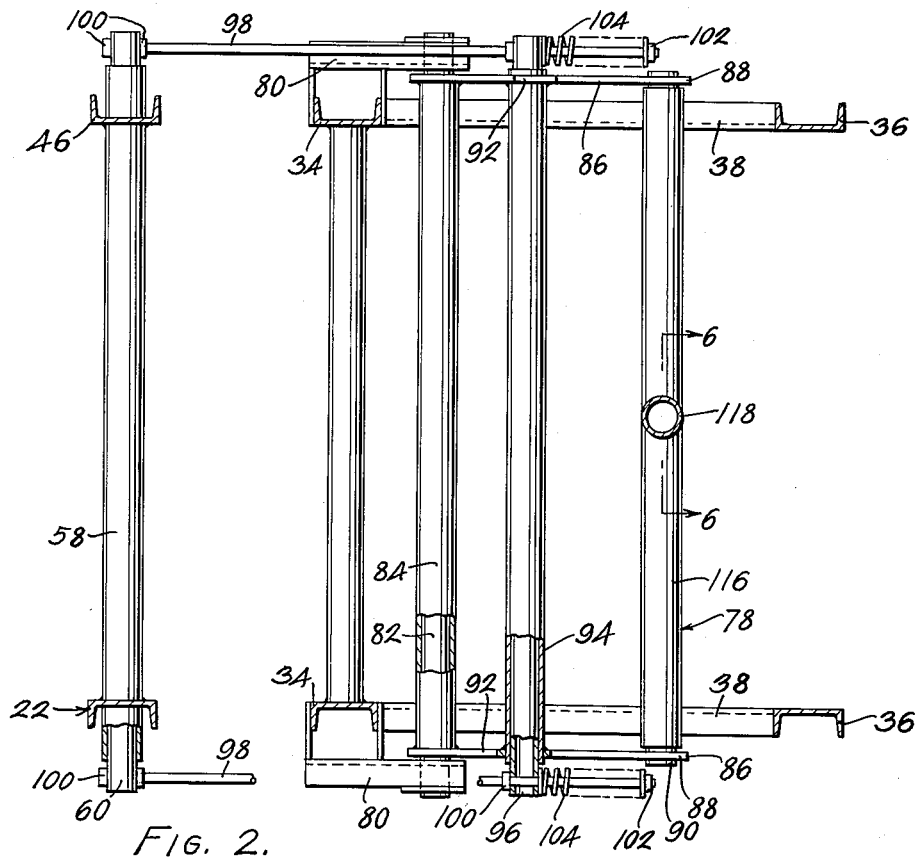
FIGURE 2 is a fragmentary transverse section to an enlarged scale taken along line 2—2 of FIGURE 1A, portions thereof having been broken away to better show the construction.
Figure 3:
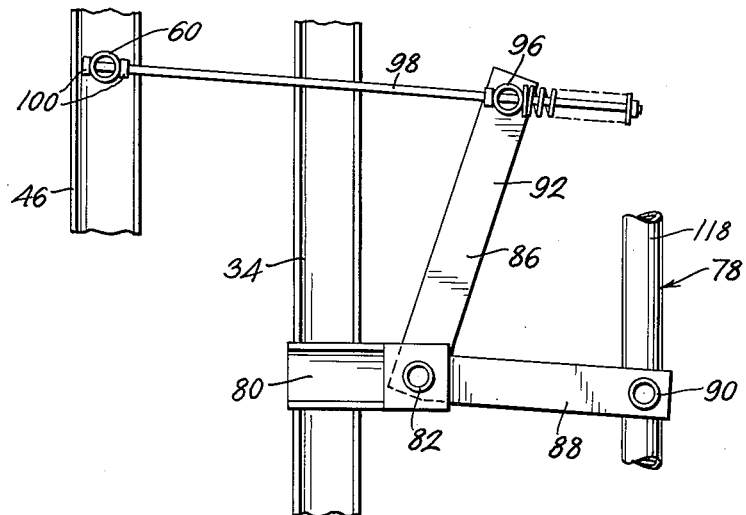
FIGURE 3 is a fragmentary side elevation showing the bell crank portion of the link assembly as illustrated in FIGURE 2.

Referring now to the drawing and in particular to FIGURES 1A and 1B thereof, the bag elevator of the present invention will be seen to comprise a fixed frame, indicated in a general way by numeral 10, which includes a horizontal section 12 at the intake end, an inclined intermediate section 14 and an upright section 16 at the discharge end; a curved floating frame section, referred to broadly by numeral 18, arranged in spaced relation to the inclined section of the fixed frame and including a plurality of hingedly interconnected frame segments 20; and, a rigid but yieldable frame section, generally designated by 22, operatively connected to the floating frame and arranged in spaced relation to the upright section of the fixed frame. More specifically, the horizontal section 12 of the fixed frame 10 is, in the particular embodiment illustrated herein, formed from a pair of ground-supported horizontal side frame elements 24 arranged in transversely spaced substantially parallel relation which are interconnected by transverse frame elements, some of which are in the form of tubular elements and have been identified by numeral 26 that perform the secondary function of supporting the portion of the endless spring belts 28 which lies between the grooved rollers 30. Vertical elements 32 attached to horizontal side frame elements 24 of the horizontal frace section function to maintain the floating frame section 18 centered therebetween and over the inclined section 14 of the fixed frame.

Similarly, the upright section 16 of the fixed frame, as illustrated herein, comprises four ground-supported upright side frame elements having their lower ends attached to the rear ends of horizontal side frame elements 24. These four upright side frame elements are arranged in transversely spaced substantially parallel pairs, each pair of which includes a front upright side frame element 34 and a rear upright side frame element 36. Suitable braces 38 interconnect the front and rear side frame elements 34 and 36 of each pair while tubular elements 26, aforementioned, function to maintain elements 34 in fixed spaced relation.

The inclined section 14 of the fixed frame, on the other hand, comprises merely a transversely spaced pair of diagonal elements 40 attached between the elements 28 and 34 of the horizontal and upright frame sections, respectively. In this specific embodiment of the invention, the middle grooved roller 30 carried by the inclined frame section 14 of the fixed frame is journalled for rotation about a transverse axis offset beneath the plane containing the axes of rotation of the rollers on either side thereof which are mounted between side plates 42 carried by diagonal element 40. Note, also, that each of the tubular elements 26 is located such that it is substantially tangent to the inside of the endless spring belts 28 stretched between adjacent grooved rollers 30 on the inside edges of the respective frame sections, the elements 26 carried by diagonal elements 40 of the inclined frame section being suitably elevated on lugs 44 along with the adjacent tubular elements carried by the horizontal and upright frame sections.

Figure 4:
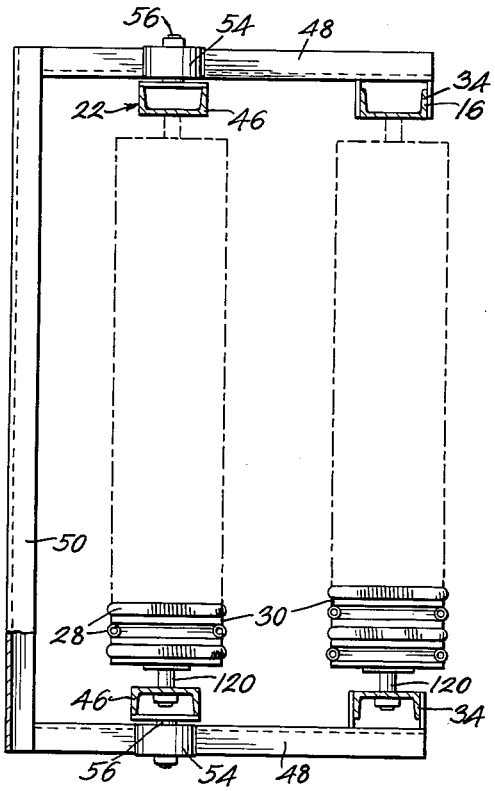
FIGURE 4 is a fragmentary transverse section to an enlarged scale taken along line 4—4 of FIGURE 1A illustrating one of the rolling supports for the yieldable frame section.

Reference will now be had to FIGURES 1A, 1B and 4 for a detailed description of the construction and means by which the yieldable frame section 22 is mounted for rolling movement relative to the fixed frame 10. First of all, yieldable frame section 22 will be seen to include two upright side frame elements 46 arranged in transversely spaced substantially parallel relation to one another and interconnected by tubular elements 26. At longitudinally spaced points along upright frame section 16 of the rigid frame, a pair of spaced substantially parallel rails 48 are attached to the front upright side frame element 34 in position to extend forwardly therefrom where their free ends are connected together by transverse element 50 which is welded or otherwise permanently attached therebetween in position to form a closure for the front end of roller track 52. Rollers 54 mounted for rotation on axles 56 projecting outwardly from the sides of frame elements 46 of the yieldable frame section, roll back and forth on rails 48 within track 52 thus providing for relative movement between the yieldable and fixed frames.

It will also be seen in Figures 1A, 1B, 5 and 8 that side frame elements 34 and 46 of the yieldable and upright frame sections, respectively, also include other transverse tubular elements 58 similar to elements 26 but arranged in opposed parallel relation to one another at longitudinally spaced points above and below rails 48. Mounted for rotation in each of these tubular elements 58 is a smaller tubular element 60 projecting slightly beyond the ends thereof. The ends of the tube 60 mounted inside tube 58 carried by the upright frame are attached to a pair of transversely spaced forwardly extending tubes 62 that are slidably mounted in short tubular sections 64 on the ends of the other tubular element 58 connected to the yieldable frame. In addition, the front ends of tubes 62 are interconnected by a transversely extending tube 66 that forms with tubes 62 and 60 a generally rectangular tubular assembly operatively connecting the yieldable frame section 22 to the upright frame section 16 of the fixed frame 10 together for relative slidable movement. Also, the rotatable mounting of tubes 60 within tubes 58 provides a construction whereby the yieldable frace section may tilt slightly relative to the upright section of the fixed frame. This arrangement allows these yieldable and upright frame sections to spread apart and admit a filled bag passing upwardly therebetween. If desired, a scale 68 can be mounted on one of the tubes 62 for movement relative to an index 70 carried by element 64 to indicate the spacing between the fixed and yieldable frames.

Again referring to FIGURE 1A of the drawing, the floating frame section 18 will be seen to have its upper end hingedly connected to the lower end of the yieldable frame section for relative movement toward and away from the inclined fixed frame section 14. Note, however, that this is the only connection for the floating frame, all of the hinged segments 20 thereof, except for the pivotal connections therebetween, merely resting upon plates 72 carried on the upper ends of rods 74 which are adjustably mounted on the diagonal elements 40 of the inclined frame section 14 by means of thumb screws and rod brackets 76. These adjustable rods and plates determine the spacing between the endless spring belts carried by the floating and inclined frame sections in order to accommodate filled bags of different thicknesses; however, it is important to note in this connection that the floating frame 18 is completely free to raise off the plates and widen the space between the opposite conveyor sections in order to admit an oversize bag into the intake end of the elevator without tearing or otherwise damaging it. Also, the weight of the floating frame section and associated spring belt conveyor assembly carried thereby pressing on the filled bags performs a preliminary bag-flattening function that is completed when the packages pass between the yieldable and upright frame sections.

The spring-biased link assembly which has been designated generally by numeral 78 and which functions to control the spacing between the yieldable and upright frame sections by means of a yieldable connection, can best be seen in FIGURES 1A, 1B, 2 and 3 to which reference will now be had. A pair of rearwardly extending brackets 80 are attached to the outside of the front side frame elements 34 of the upright section of the fixed frame in transversely spaced relation and at various points throughout its length. Each pair of brackets is interconnected by an inner tubular element 82 that forms a hollow shaft upon which a bell crank assembly turns. This bell crank assembly includes an outer tubular element 84 mounted on element 82 for rotational movement and a pair of bell cranks 86 welded or otherwise permanently attached to opposite ends of the outer tubular element for conjoint rotation therewith. The legs 88 of the bell cranks are interconnected by an inner tube 90 while the other legs 92 are similarly connected by an outer tube 94. Each of the outer tubes 94 includes mounted for rotation therein an inner tube 96 that projects slightly beyond the opposite ends thereof.

Figure 5:
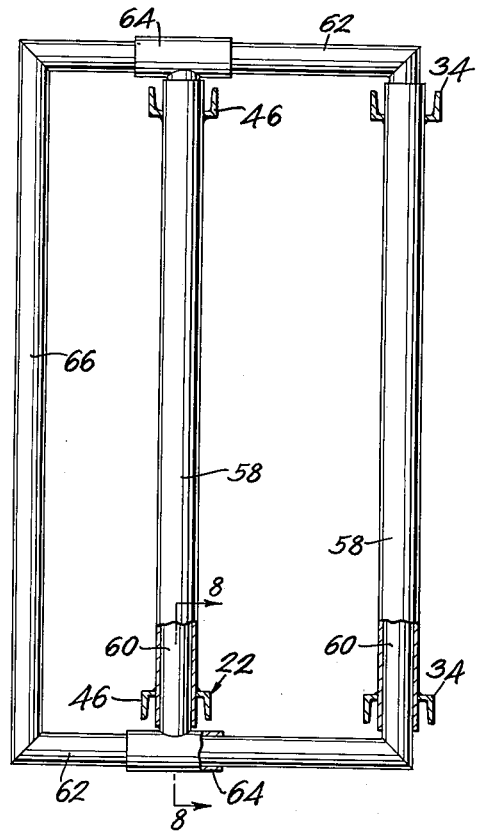
FIGURE 5 is a fragmentary transverse section to an enlarged scale taken along line 5—5 of FIGURE 1B showing one of the sliding supports for the yieldable frame section.
Figure 6:
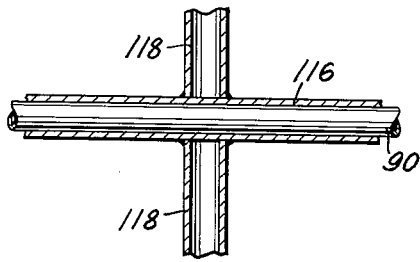
FIGURE 6 is a section taken along line 6—6 of FIGURE 2.
Figure 8:
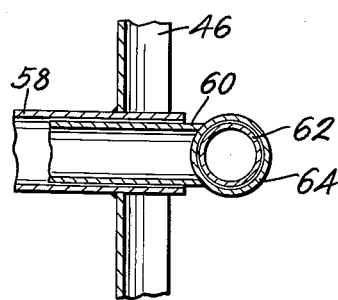
FIGURE 8 is a fragmentary section taken along line 8—8 of FIGURE 5.
Figure 7:
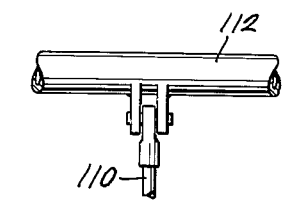
FIGURE 7 is an enlarged fragmentary elevation illustrating the pivotal connection between the piston of the hydraulic cylinder and the bell crank of the link assembly.

It will also be seen, especially in FIGURE 2, that elements 46 of the yieldable frame section are interconnected by transverse tubular elements 58 having smaller tubular elements 60 rotatably mounted inside thereof in substantially the same manner as has already been described in connection with FIGURE 5 of the drawings; however, tubes 58 and 60 in this instance are located opposite the tubes which interconnect arms 92 of the bell cranks 86 and connecting rods 98 are substituted for the short tubular members 64 on the ends of tube 60. Rods 98 interconnect tubes 60 and 96 passing through suitable openings therein. Fixed abutments 100 are carried by rods 98 lapping tube 60 and ahead of tube 96 in spaced relation to nut 102 on the rear end thereof. A compression spring 104 having washers at opposite ends thereof is mounted on the rear end of each rod 98 between tube 96 and nut 102. Thus, rotational movement of the bell crank assembly on hollow shaft 82 will cause the yieldable frame section 22 to move toward or away from upright section 16 of the fixed frame in order to vary the spacing therebetween to adjust for filled bags of different thicknesses. The aforementioned bell crank adjustment to vary the spacing between the upright and yieldable frame sections, however, is not intended to compensate for variations in package size due to non-uniformity in the individual packages as it remains fixed during a given run; but, rather, this adjustment is provided so that the elevator can be set to handle any given filled bag size whether large or small. On the other hand, it is the spring-biased yieldable connection between tubes 60 and 96 when tube 96 is fixed that provides for limited relative movement between the frame sections 22 and 16 to compensate for variations in the size of the individual packages. As an overfilled bag that is slightly thicker than the rest passes into position between frame sections 22 and 16, rods 98 become extended compressing spring 104 and allowing these frame sections to separate farther which, of course, permits the bag to move therethrough without tearing. In actual operation, the spring belt conveyor assemblies carried by the fixed and yieldable frames are spaced apart by the bell crank assembly a distance slightly less than the minimum thickness of the filled bags so that springs 104 are compressed slightly at all times during the elevating operation in order that the packages cannot slip down and also to complete the bag-flattening operation.

Referring now to FIGURES 1A, 1B, 2, 3, 6, 7 and 8, the hydraulically-operated actuating mechanism, indicated broadly by numeral 106, which is used to operate the link assembly 78 will be seen to include a hydraulic cylinder 108 pivotally mounted on one of the cross frame elements of the fixed frame and having a piston 110 mounted therein for reciprocal movement that is pivotally connected to tube 112 that interconnects the extended legs 88m of one of the pairs of bell cranks 86m. Fluid lines 114 connected into opposite ends of the hydraulic cylinder are, in turn, connected to means (not shown) of conventional design operative to reverse the direction of fluid flow to the cylinder such as, for example, a reversible pump or preferably a pump and valve combination including a by-pass connection. Each of the inner tubular elements 90 which interconnect the legs 88 of the bell cranks has mounted thereon for relative rotational movement, an outer tubular element 116 as shown most clearly in FIGURES 2 and 6. Now, the actuating mechanism is completed by means of a series of upright tubular elements 118 welded or otherwise permanently attached between adjacent outer tubular elements 116. Accordingly, fluid-actuated reciprocal movement of piston 110 within cylinder 108 will act through tube 112 to turn bell cranks 86m which, in turn, operate through tubes 90, 116 and 118 to accomplish the same motion in the other pairs of bell cranks 86 thus shifting the yieldable frame section 22 relative to the fixed frame 10.

Finally, with reference to FIGURES 1A, 1B and 4, it will be desirable to describe briefly the more or less conventional spring belt driven conveyor assemblies carried by the elevator. All of the grooved rollers 30 are journalled for rotation in longitudinally spaced parallel relation on shafts 120 extending transversely between the side frame elements of the several frame sections. These shafts 120 in the floating frame section 18 of the elevator perform the added function of providing the pivotal connection between the hinged segments 20 thereof. One of the shafts 120 also forms the pivotal connection between the floating and yieldable frame sections. Alternate endless spring belts 28 extend forwardly and rearwardly from each grooved roller to the adjacent rollers on both sides thereof. Certain of the rollers 122 are drive rollers operatively connected to small electric motors 124 by means of belt drives 126.

Both front and rear side frame elements 34 and 36 of the fixed frame are provided with rollers 30 at the upper end of the elevator arranged in slightly inclined relation to the horizontal and operatively interconnected to one another by spring belts 28, as shown in FIGURE 1B. The upper end of the yieldable frame 22 projects above the corresponding end of the fixed frame a short distance and is provided with an adjustable kicker plate 128 attached between side frame elements 46 for pivotal movement. This kicker plate 128 is inclined rearwardly and functions to direct the packages discharged from between the yieldable and upright frame sections over onto the belts located atop the fixed frame.

In closing, note that although the elevator has been shown in the form required to elevate filled bags vertically, this construction is by no means critical and the yieldable upright frame sections can be inclined at any desired angle above horizontal. Also, the elevator has been described in connection with its primary function of raising filled bags from one level to another; however, it can also be used to lower packaged materials in the same manner, although for this purpose the inclined and floating sections of the frame are preferably connected to the upper ends of the yieldable and upright sections rather than the lower ends as shown.

Having thus described the several useful and novel features of the bag elevator of the present invention in connection with the single specific embodiment thereof illustrated in the accompanying drawings, it will be seen that the many worthwhile objectives for which it was designed have been achieved. I realize, however, that certain changes and modifications therein may occur to those skilled in the art within the broad teaching hereof; hence, it is my intention that the scope of protection afforded hereby shall be limited only insofar as said limitations are expressly set forth in the appended claims that follow.

What is claimed is:

1. In a conveyor of the type particularly suited for use in transferring filled bags from one level to another, a fixed frame and a movable frame arranged in spaced face-to-face relation, a plurality of grooved rollers mounted in longitudinally spaced relation on each frame for rotational movement about transverse axes, drive means operatively connected to at least one roller on each frame, endless spring belts operatively interconnecting each roller with the adjacent rollers on both sides thereof in each frame, both the fixed and movable frames including a substantially straight section and a curved section arranged in end-to-end relation, the curved section of the movable frame being suspended from the lower end of the straight section and comprising a plurality of hingedly interconnected segments, mounting means interconnecting the straight sections of the fixed and movable frames adapted to provide for adjustable relative straight-line movement in a direction to vary the spacing therebetween, means interconnecting the straight sections of the fixed and movable frames operative upon actuation to selectively adjust the spacing therebetween while maintaining their relative positioning and to yieldably resist forces tending to spread them apart, said means comprising link means being carried by one of said frame sections and spring-biased means operatively interconnecting said link means with the other of said frame sections, and supporting means carried by one of the curved sections in engagement with the other of said curved sections adapted to permit the hinged segments to raise off the fixed frame when an oversize filled bag is passed therebetween.

2. The conveyor as set forth in claim 1 in which the mounting means interconnecting the straight sections of the fixed and movable frames comprises tracks depending from one of said straight sections and rollers depending from the other in rolling engagement with said tracks.

3. The conveyor as set forth in claim 1 in which the link means comprises, bell crank means mounted for rotational movement on one of the straight sections and having one leg thereof operatively connected to the spring-biased means, and actuating means connected to the other leg of the bell crank means operative upon actuation to rotate same.

4. The conveyor as set forth in claim 1 in which aligning means interconnect the straight sections of the fixed and movable frames adapted to prevent lateral movement therebetween while permitting relative movement toward and away from one another.

5. The conveyor as set forth in claim 1 in which the spring-biased means yieldably interconnecting one of the straight sections with the link means carried by the other straight section comprises, rod means having one end pivotally attached to the straight frame section and the other end which includes an abutment attached to the link means for relative sliding movement, and spring means interconnecting the abutment and link means in a manner to yieldably resist slidable movement of the rod means relative to said link means in a direction to spread the straight sections apart.

6. The conveyor as set forth in claim 2 in which the tracks comprise spaced substantially parallel rails with the roller mounted therebetween adapted to prevent relative longitudinal movement between the fixed and movable frames.

7. The conveyor as set forth in claim 2 in which the link means comprises, bell crank means mounted for rotational movement on one of the straight sections and having one leg thereof operatively connected to the spring-biased means, and actuating means connected to the other leg of the bell crank means and operative upon actuation to rotate same.

8. The conveyor as set forth in claim 2 in which aligning means interconnect the straight sections of the fixed and movable frames adapted to prevent lateral movement therebetween while permitting relative movement toward and away from one another.

9. The conveyor as set forth in claim 2 in which the spring-biased means comprises, rod means having one end pivotally attached to the straight frame section and the other end which includes an abutment attached to the link means for relative sliding movement, and spring means interconnecting the abutment and link means adapted to yieldably resist slidable movement of the rod means relative to said link means in a direction to spread the straight sections apart.

10. The conveyor as set forth in claim 3 in which the actuating means comprises a cylinder pivotally attached to the straight frame section, a piston mounted for reciprocal movement in the cylinder and pivotally attached to the leg of the bell crank means, and means operative to reciprocate the piston within the cylinder.

11. The conveyor as set forth in claim 3 in which the bell crank means comprises at least two bell cranks mounted for rotational movement on the straight section of the fixed frame and a rigid element interconnecting the cranks for conjoint movement.

12. The conveyor as set forth in claim 3 in which aligning means interconnect the straight sections of the fixed and movable frames adapted to prevent lateral movement therebetween while permitting relative movement forward and away from one another.

13. The conveyor as set forth in claim 3 in which the spring-biased means comprises, rod means having one end pivotally attached to the straight frame section and the other end which includes an abutment attached to the link means for relative sliding movement, and spring means interconnecting the abutment and link means adapted to yieldably resist slidable movement of the rod means relative to said link means in a direction to spread the straight sections apart.

14. The conveyor as set forth in claim 4 in which the aligning means comprises an arm pivotally attached to one straight section and extending toward the other, and a sleeve attached to the other of the straight frame sections for rotational movement and positioned to slidably receive the arm.

15. The conveyor as set forth in claim 4 in which the spring-biased means comprises, rod means having one end pivotally attached to the straight frame section and the other end which includes an abutment attached to the link means for relative sliding movement, and spring means interconnecting the abutment and link means adapted to yieldably resist slidable movement of the rod means relative to said link means in a direction to spread the straight sections apart.

16. The conveyor as set forth in claim 5 in which the link means comprises, bell crank means mounted for rotational movement on one of the straight sections and having one leg thereof operatively connected to the spring-biased means, and actuating means connected to the other leg of the bell crank means and operative upon actuation to rotate same.

References Cited in the file of this patent

UNITED STATES PATENTS

| | | |
|---|---|---|
| 551,509 | Paul | Dec. 17, 1895 |
| 830,588 | Hanson | Sept. 11, 1906 |
| 2,490,381 | Shields | Dec. 6, 1949 |

FOREIGN PATENTS

| | | |
|---|---|---|
| 91,536 | Norway | Apr. 21, 1958 |